Sept. 3, 1968 T. A. ANASTASIO 3,400,286
MOTOR FOR USE IN HIGH VACUUM SYSTEM
Filed Sept. 30, 1964 2 Sheets-Sheet 1
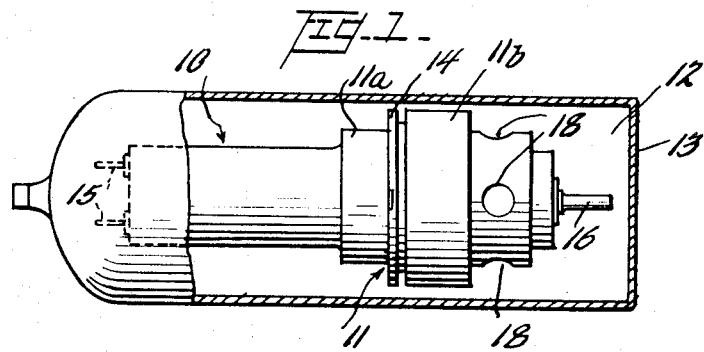
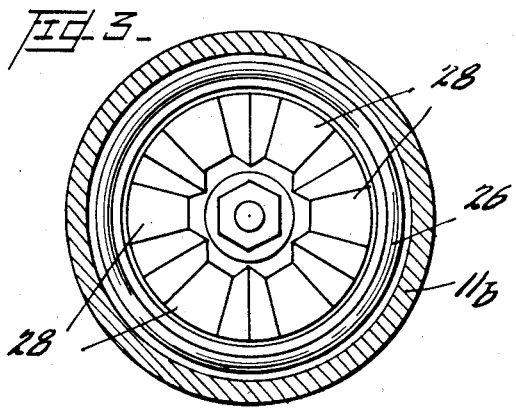
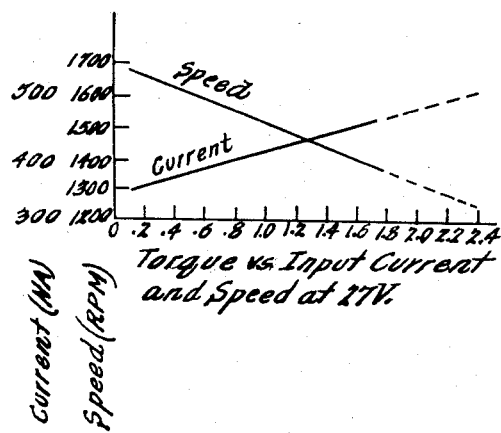
Torque vs. Input Current
and Speed at 27V.
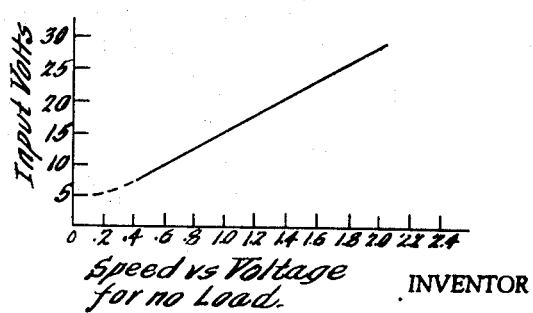
Speed vs Voltage
for no Load.
INVENTOR
Thomas A. Anastasio,
BY
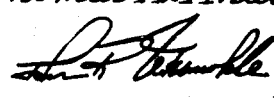
ATTORNEY

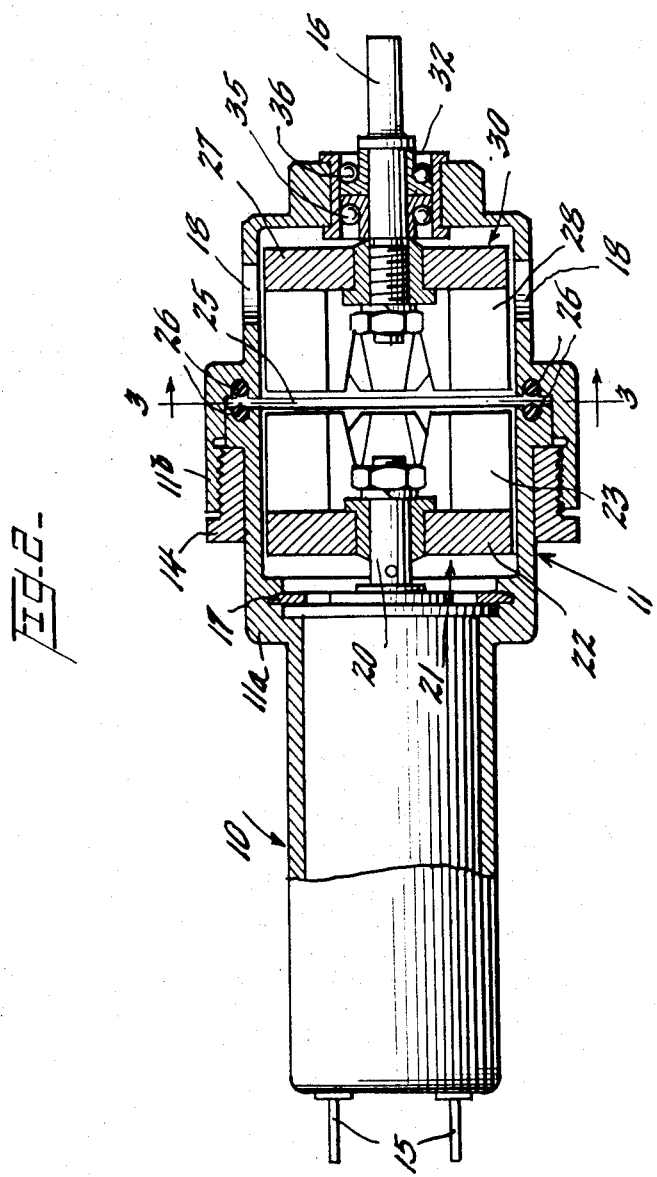

United States Patent Office 3,400,286
Patented Sept. 3, 1968

3,400,286
MOTOR FOR USE IN HIGH VACUUM SYSTEM
Thomas Anthony Anastasio, Glen Burnie, Md., assignor to the United States of America as represented by the Secretary of the Army
Filed Sept. 30, 1964, Ser. No. 400,618
6 Claims. (Cl. 310—98)

ABSTRACT OF THE DISCLOSURE

A motor for use in a high-vacuum chamber including a completely sealed, electrical motor for retaining the interstices of the motor at atmospheric pressure in which the motor is placed entirely within an evacuated system, the motor further being placed within a casing which includes a completely sealed, normal-atmosphere housing and a vacuum housing. A magnetic coupling drive is connected to the motor within the casing and imparts rotary motion to a shaft which extends from within the casing into the evacuated system.

---

The invention described herein may be manufactured and used by or for the Government for governmental purposes without the payment to me of any royalty thereon.

This invention relates to motors, and more particularly to motors for use in high-vacuum chambers.

The problem of providing rotary motion in high-vacuum systems has usually been solved by various feed-through devices involving O-rings, grease fittings, and the like, or by means of magnetic drives through the chamber wall. These feed-throughs are commercially available in great variety but have a practical difficulty in common. This difficulty is that the motion cannot generally be applied at every location within the chamber without drive mechanisms such as pulleys, chains, gears, etc. Furthermore, many rotary feed-throughs cannot be operated at high speeds (greater than 500 r.p.m.) without damage to the seals.

A problem with standard motors is that there is a gradual contamination of the vacuum due to outgassing of the motor. Outgassing consists of two separate undesirable characteristics. One of these undesirable characteristics is created by the vacuum. As the operation of the ordinary motor in a vacuum continues, the vacuum tends to attack the coil insulation, and there is brought about an actual physical evaporation of the coils of the motor, thus causing a complete deterioration and breakdown of the motor and system. The second undesirable characteristic of outgassing is the virtual leakage of air through the coils. This air is semi-trapped between the coils of the motor, and, as the motor continues to operate, this air tends to leak slowly from between these coils into the vacuum. Thus, the evaporating coils and the slow leakage of air into the vacuum tend to contaminate and break down the vacuum.

A further problem (with D.C. motors in particular) is the rapid erosion of brushes and commutators due to the high friction exhibited by most materials in a vacuum environment. This is eliminated in this device.

It is an object of this invention to overcome the disadvantages of the prior art and provide an improved motor for use in high vacuums.

It is another object of this invention to provide an improved motor for use in high vacuums which eliminates the danger of outgassing of the motor.

It is another object of this invention to provide an improved motor for use in high vacuums which eliminates the evaporation of the motor coils.

It is another object of this invention to provide an improved motor for use in high vacuums which eliminates virtual leakage which is highly undesirable.

It is another object of this invention to provide an improved motor for use in high vacuums which can be operated in any position within the evacuated system.

With these and other objects in view, a motor for use in high vacuums may include a completely sealed, electrical motor for retaining the interstices of the motor at atmospheric pressure and operable in any position within an evacuated system without danger of contamination due to outgassing of coil insulation and other materials.

More specifically, in one embodiment of the present invention, a motor is placed entirely within an evacuated system, the motor further being placed within a casing which includes a completely sealed, normal-atmosphere housing and a vacuum housing. A magnetic coupling drive is connected to the motor within the casing. This magnetic coupling drive imparts rotary motion to a shaft which extends from within the casing into the evacuated system. This shaft permits the transmission of mechanical power to any point within the evacuated system. The motor is sealed within the normal-atmosphere housing allowing the motor to be operated without danger of contamination of the vacuum due to outgassing of the motor.

Other objects and advantages of the present invention will be apparent from the following detailed description, when considered in conjunction with the accompanying drawing, wherein:

FIG. 1 is a side elevation, partially in section, of the motor of the present invention, contained within a bell jar;

FIG. 2 is a side elevation, partially in section, of the motor shown in FIG. 1;

FIG. 3 is a vertical section taken along the line 3—3 of FIG. 2, and

FIGS. 4 and 5 are plots of the operating characteristics of the motor.

Description

In the embodiment of the invention shown in FIG. 1, a casing 11 preferably of non-magnetic stainless steel, including a normal-atmosphere housing 11a and a vacuum housing 11b, is provided for completely containing and sealing the motor 10 from the surrounding evacuated system 12 within a bell jar or chamber 13 in which the motor is placed. For certain applications the casing 11 could be made of magnetic materials. A flange 14 is provided to allow the motor to be attached through the chamber walls of the evacuated system 12 if desired. Electrical connection may be made to the motor through vacuum-tight, feed-through openings 15 at the rear of the normal-atmosphere housing 11a. A shaft 16 is provided at the front end of the vacuum housing 11b for transmitting mechanical power to any point within the evacuated system 12. Four openings 18 are provided spaced 90° apart around the periphery of the vacuum housing 11b.

As shown in FIG. 2, the electrical motor 10 is placed within the normal-atmosphere housing 11a which is placed entirely within the evacuated system (not shown in this figure). Vacuum-tight, feed-through openings 15 are provided at the rear of the normal-atmosphere housing 11a for making electrical connections to the motor 10. The motor 10 is provided with a retaining ring 17 and a shaft 20. Attached to the shaft 20 is a normal-atmosphere-housing-rotor assembly 21 which contains a cylindrical, driving magnet 22 having a plurality of poles as at 23. Adjacent to the driving magnet 22 is a seal plate or diaphragm 25 provided with rubber sealing O-rings 26.

The diaphragm 25 may be of brass or high density alumina. The preferred embodiment as shown in FIG. 2 employs a .062 inch thick alumina plate cut from a standard 99% $Al_2O_3$ bar. In order to obtain the minimum safe thickness, use is made of the formula $$0.302 d^2 p / t^2 = \text{tensile strength}$$

where $d$ is the unsupported diameter in inches, $p$ is the pressure differential in lbs.-in.$^{-2}$ and $t$ is the thickness in inches. The .062 inch thickness used in the diaphragm of the preferred embodiment is well within the limit of the value determined by the formula for the material used.

The seal plate or diaphragm 25 is vertically positioned within the casing 11. On the other side of the seal plate or diaphragm 25 is a cylindrical, driven magnet 27 having a plurality of poles as at 28 mounted on a vacuum-housing-rotor assembly 30. The four openings 18 (two of which are shown) are spaced 90° apart around the periphery of the vacuum housing 11b, adjacent to the vacuum-housing-rotor assembly 30 to prevent virtual leakage from the normal-atmosphere housing 11a. Connected to the driven magnet 27 is the shaft 16 which extends through an opening 32 in the vacuum housing 11b into the evacuated system 12 (not shown in FIG. 2). The opening 32 is provided with a pair of ball bearings 35 and 36 of stainless steel lubricated with tungsten diselenide. The ball bearings 35 and 36 are preloaded during the construction of the vacuum-housing-rotor assembly 30 to maintain proper separation between the diaphragm 25 and the driven magnet 27.

FIG. 3 shows a vertical section taken along the line 3—3 of FIG. 2. Driven magnet 27, as well as driving magnet 22, includes a plurality of circularly disposed poles as at 28 in FIG. 3. Also included in this figure are one of the O-rings 26 and the vacuum housing 11b in cross section.

*Operation*

In the operation of the motor, when electrical connections are made to the motor through openings 15 in the rear of the normal-atmosphere housing 11a and the motor is started up, the driving magnet 22 is rotated on the end of the shaft 20. As the driving magnet 22 rotates, it drives the driven magnet 27 which causes the shaft 16 to rotate and thus transmit mechanical power to the evacuated system 12. The atmosphere in which the motor was assembled is retained within the normal-atmosphere housing 11a thus preventing any contamination of the vacuum within the evacuated system 12 due to outgassing of the motor, which might otherwise occur if the motor were not isolated from the surrounding vacuum. The motor device may be mounted in any desired manner within the evacuated system or may be attached through the chamber wall if desired.

*Performance*

FIG. 4 shows a graph of torque versus input current and speed for the motor at 27 volts. FIG. 5 is a graphic illustration of the motor's characteristics for speed versus voltage for no load. The motor has been used in a vacuum chamber in which normal ultimate pressure of $5 \times 10^{-6}$ torr and pump-down time were unaffected.

Oviously, many modifications and variations of the present invention are possible in the light of the above teachings. It is therefore to be understood, that within the scope of the appended claims, the invention may be practiced otherwise than as specifically described.

What is claimed is:

1. A power device for use within an evacuated system which comprises a casing including a completely sealed, normal-atmosphere housing and a vacuum housing, an electrical motor disposed within the normal-atmosphere housing, a magnetic coupling drive within the casing connected to the motor, a rotatable shaft connected to the magnetic coupling drive and disposed partially within the vacuum housing, the shaft extending into the evacuated system through a sealed opening in the vacuum housing and designed to transmit mechanical power to any point within the evacuated system, the motor being maintained at a normal atmosphere to allow the motor to be operated in any position entirely within the evacuated system without danger of contamination of the vacuum due to outgassing of the motor.

2. A power device for use within an evacuated system which comprises a vacuum housing, a rotatable shaft having a portion thereof extending into the vacuum housing and the remaining portion into the evacuated system, a magnetic coupling drive for transmitting rotary motion to the shaft, the magnetic drive including a driving magnet and a driven magnet, the driven magnet being connected to the shaft, a seal plate disposed between the magnets for creating an air-tight seal therebetween, an electrical motor for driving the magnetic drive, another shaft connecting the motor and the driving magnet, and a completely sealed, normal-atmosphere housing in which the motor, the other shaft and the driving magnet are disposed, the normal-atmosphere housing having vacuum-tight, feed-through openings therein for passing electrical leads therethrough to make electrical connections with the motor, the motor thus being maintained at the atmosphere in which it was assembled to allow the motor to be operated in any position entirely within the evacuated system without danger of contamination of the vacuum due to out-gassing of the motor which otherwise would occur if the motor were not isolated from the surrounding evacuated system.

3. In an evacuated system, a power device which comprises a casing including a vacuum housing and a completely sealed, normal-atmosphere housing, a rotatable shaft having a portion thereof extending into the vacuum housing and the remaining portion into the evacuated system, a cylindrical, driven magnet connected to the portion of the shaft within the vacuum housing for imparting rotational movement to the shaft, a cylindrical, driving magnet disposed adjacent to the driven magnet, both magnets having their axes aligned a seal plate vertically disposed between the two magnets and provided with means for creating an air-tight seal between the vacuum housing and the normal-atmosphere housing, another shaft connected to the driving magnet, and an electrical motor connected to the driving magnet by the other shaft for rotating the driving magnet, the motor, the other shaft and the driving magnet sealed within the normal-atmosphere housing, the normal-atmosphere housing having vacuum-tight, feed-through openings therein for passing electrical leads therethrough to make electrical connections with the motor, the motor being maintained at a normal atmosphere thus allowing the motor to be operable in any position entirely within the evacuated system without danger of contamination of the vacuum due to outgassing of the motor.

4. A power device for use in an evacuated system which comprises an electrical motor for transmitting mechanical power within an evacuated system, a casing including a completely sealed, normal-atmosphere housing and a vacuum housing, the motor being sealed within the normal-atmosphere housing, vacuum-tight, feed-through openings into the normal-atmosphere housing for making electrical connections to the motor, a shaft, a cylindrical, driving magnet within the normal-atmosphere housing connected to the motor by means of the shaft, a cylindrical, driven magnet within the vacuum housing and disposed adjacent to the driving magnet, both magnets having their axes aligned, a diaphragm positioned between the adjacent magnets and provided with means for sealing the motor and driving magnet from the driven magnet within the casing, and another shaft connected to the driven magnet for transmitting mechanical power within the evacuated system, the other shaft extending through an opening in one end of the vacuum housing into the evacuated system, stainless steel ball bearings lubricated with tungsten diselenide sealing the opening through which the other shaft passes, the motor internally retaining a normal atmosphere thus allowing the motor to be operable in any position entirely within the evacuated system without danger of contamination to the vacuum due to outgassing of the motor.

5. A motor for use in an evacuated system, as defined in claim 4, in which the diaphragm is made of brass.

6. A motor for use in an evacuated system, as defined in claim 4, in which the diaphrgam is made of alumina.

References Cited

UNITED STATES PATENTS

| 3,168,664 | 2/1965 | Bost | 310—98 |
| 3,196,302 | 7/1965 | Dechet | 310—98 |
| 3,157,808 | 11/1964 | Lloyd | 310—96 X |
| 3,268,750 | 8/1966 | Gerber | 310—96 |
| 2,700,739 | 1/1955 | Orlando. | |

ROBERT K. SCHAEFER, *Primary Examiner.*

H. O. JONES, *Assistant Examiner.*